Sept. 6, 1966   H. A. WHEELER   3,271,773
MODE-SEPARATION CIRCULAR WAVEGUIDE AND ANTENNAS USING SAME
Filed Jan. 22, 1964   3 Sheets-Sheet 1

Patented Sept. 6, 1966

3,271,773
MODE-SEPARATION CIRCULAR WAVEGUIDE AND ANTENNAS USING SAME
Harold A. Wheeler, Great Neck, N.Y., assignor to Hazeltine Research Inc., a corporation of Illinois
Filed Jan. 22, 1964, Ser. No. 339,408
10 Claims. (Cl. 343—778)

This invention relates to waveguides with increased useful bandwidths, which are capable of propagating circularly polarized waves. More particularly, the invention relates to circular waveguides including spaced dielectric discs designed to increase the separation between the cutoff frequencies of the dominant mode and the second mode of electromagnetic propagation in the waveguide, and to antennas utilizing such waveguides.

The principles of construction and operation of many types of waveguides are well known to workers in this field. The word waveguide is used to denote a hollow cylinder-type of transmission means as contrasted to coaxial or other multiple conductor transmission lines. As already noted, this invention relates to waveguides capable of propagating circularly polarized waves. The most commonly known waveguides of this type take the form of metallic cylinders of circular cross-section; however, it is well known that metallic cylinders of hexagonal or other regular polygonal cross-section can also be used. The following description will refer particularly to circular waveguides, but it will be clear that the invention applies equally to waveguides of other shapes which are capable of propagating circularly polarized waves.

For each mode of propagation in waveguide, there is a critical (cutoff) frequency below which waves do not propagate. In practice it is usually desirable to restrict the propagation to a single mode. If the dominant (TE–11) mode in circular waveguide is to be utilized, other modes may be excluded by operating at frequencies below the cutoff of the next mode (usually the second or TM–01 mode). Thus the ratio of the second (TM–01) mode cutoff frequency over that of the dominant (TE–11) mode limits the waveguide's useful bandwidth. This ratio is 1.31 for a uniform waveguide completely filled with any homogeneous istropic dielectric (such as air or a solid dielectric for example).

The useful (single mode) bandwidth of such a waveguide can be calculated by assuming that it is desirable to operate from twenty percent above dominant mode cutoff to a frequency somewhat below cutoff of the next mode. Under such conditions, the useful bandwidth of a circular waveguide completely filled with any homogeneous isotropic dielectric is eight percent (operation from 1.20 to 1.30 times the dominant mode cutoff frequency). In many applications it is desirable to provide for operation over a bandwidth which is greater than eight percent.

Objects of this invention are to provide new and improved waveguides with increased useful bandwidths and, in particular, circular waveguides having a single mode bandwidth in excess of twenty-five percent.

Other objects are to provide new and improved waveguides for use in waveguide components, such as rotary joints and radiating elements for array antennas, having improved electrical characteristics as will be described in greater detail below.

In accordance with the invention a mode-separation waveguide comprises a hollow cylindrical member having a conductive inner surface capable of propagating a circularly polarized wave, and a dielectric medium inside the cylinder comprising transverse regions having a first dielectric constant separated by transverse regions having a lower dielectric constant arranged so that the effective dielectric constant for transverse electric field components is higher than the effective dielectric constant for axial electric field components by a predetermined factor, the waveguide being so constructed and arranged that there is increased separation between the cutoff frequencies of the dominant mode and the second mode, as compared to the separation in a circular waveguide completely filled with any homogeneous dielectric.

For a better understanding of the present invention together with other and further objects thereof, reference is had to the following description taken in connection with the accompanying drawings, and its scope will be pointed out in the appended claims.

Figure 1:
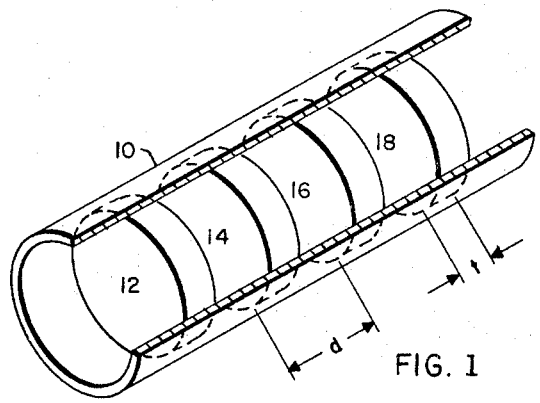
FIG. 1 shows a waveguide constructed in accordance with the invention, with a portion of the sidewall removed to show the interior.

Referring now to FIG. 1 there is shown one embodiment of a mode-separation circular waveguide constructed in accordance with the present invention. The FIG. 1 waveguide includes a hollow cylindrical member having a conductive inner surface, shown as metallic cylinder 10. The FIG. 1 waveguide also includes a dielectric medium comprising transverse regions having a first effective dielectric constant separated by transverse regions having a lower dielectric constant. As shown, this medium is made up of dielectric discs 12, 14, 16 and 18 maintained in spaced transverse relation inside cylinder 10, with a low dielectric constant material, air in this case, contained in the spaces between the discs. The discs 12, 14, 16 and 18 are constructed of material having a dielectric constant higher than the dielectric constant of air.

Waveguide of the type shown in FIG. 1 can be used as a system component in the manner of prior art types of waveguide. For example, the waveguide can be used simply as a transmission media for coupling electromagnetic waves from one point to another or can be used in place of prior types of circular waveguides as a component of a rotary joint or as a radiating element in an array antenna, etc. In such applications waveguides constructed in accordance with the present invention provide basically the same function as prior types of circular waveguides, with the important advantage of having greatly increased useful bandwidth characteristics.

Figure 2A:
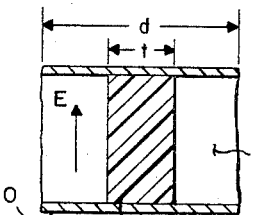
FIGS. 2a, 2b, 2c, 2d, 3, 4a, 4b and 5 are graphs and other figures useful in describing the present invention.
Figure 2B:
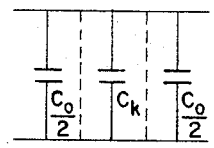

In operation, the FIG. 1 waveguide provides increased mode-separation in the manner now to be described. The mechanism of the mode-separation can be described with the aid of FIGS. 2a, 2b, 2c and 2d. In the propagation of electromagnetic waves in circular waveguide, the dominant (TE–11) mode, by definition, has its electric field only in the transverse plane of the waveguide. Thus, as shown in FIG. 2a, which is a side sectional view of a portion of the FIG. 1 waveguide, the E-lines are parallel to the discs and the effect is analogous to loading a transmission line with parallel capacitors as indicated in FIG. 2b. The total (loaded) capacitance $C_e$ is equal to the sum of the capacitance in air, $C_o$, and the capacitance in the dielectric, $C_k$: $C_e = C_o + C_k$. We may now define an effective dielectric constant $k_e$ for the dominant mode which is proportional to the total capacitance $C_e$.

Figure 2C:
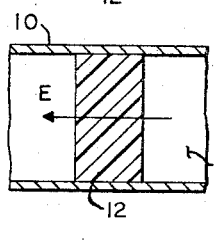
Figure 2D:
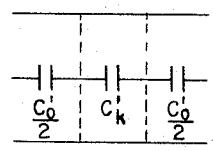

The second (TM–01) mode has axial as well as transverse components of electric field, but at cutoff the E-lines are parallel to the axis as shown in FIG. 2c. The E-lines must pass through both air and dielectric, which is analogous to loading by capacitors connected in series as indicated in FIG. 2d. The resultant capacitance $C'_e$ for this mode is much smaller than (TE–11) mode:

$$\frac{1}{C'_e} = \frac{1}{C'_o} + \frac{1}{C'_k}$$

We may now define an effective dielectric constant $k'_e$ for the second (TM–01) mode which is proportional to the capacitance $C'_e$. Since $k_e$ is proportional to the resultant of a group of parallel capacitance and $k'_e$ is proportional to the resultant of a group of series capacitances, the effective dielectric constant $k_e$ for the dominant mode will be much higher than the effective dielectric constant $k'_e$ for the TM–01 mode. This means that the ratio of the TM–01 mode cutoff frequency over the TE–11 mode cutoff frequency has been increased as desired.

To give some idea of the magnitude of the mode separation that can be obtained, let us assume that, as shown in FIG. 1, each period along the waveguide is one-third filled with a disc having a relative dielectric constant of 9 (alumina). That is to say, the dimension $t$ in FIG. 1, representing the disc thickness, is equal to one-third the dimension $d$, which represents one period along the waveguide (it will be seen that $d$ is also equal to the center-to-center spacing of the discs); this will be defined as a filling fraction of one-third. Applying the equivalent circuits of FIG. 2 we find that $k_e$ is 3.67 and $k'_e$ is 1.42. This places the TM–01 mode cutoff frequency at 2.10 times the TE–11 mode cutoff frequency. This is a great advantage over the above-mentioned ratio of 1.31 for simple dielectric filling.

Thus, the effect of the dielectric discs 12, 14, 16 and 18 in FIG. 1 is to separate the cutoff frequencies of the TE–11 and TM–01 modes by loading the former more than the latter. The dielectric discs lower the TE–11 mode cutoff frequency, but the discs have relatively little effect on the TM–01 mode. In practice, this allows the interior diameter of the waveguide to be decreased so as to raise the waveguide cutoff frequency of the TM–01 mode while still providing wideband operation in the TE–11 mode.

Figure 3:
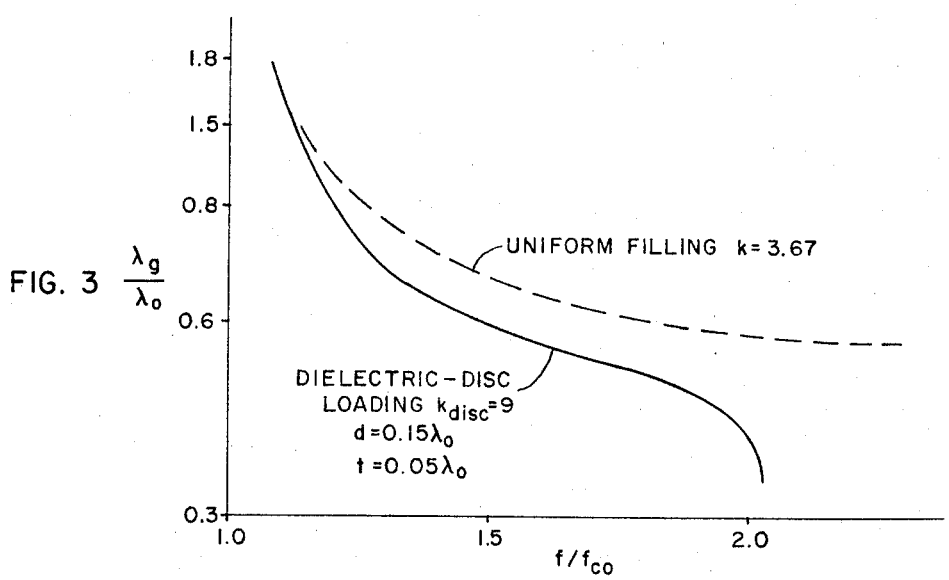

The simple relations stated above hold at all frequencies in the limit of thin discs and small spacing and also at the cutoff frequency for finite thickness and finite spacing. In order to evaluate the frequency behavior of a circular waveguide loaded with discs of finite thickness, it is necessary to recognize the periodic nature of the waveguide loading. FIG. 3 shows the frequency variation of guide wavelength $\lambda_g$ in the first pass-band for the TE–11 mode in a dielectric-disc-loaded waveguide one-third filled with alumina, as compared with that in a circular waveguide uniformly filled with dielectric material having the same average dielectric constant. As shown, the TE–11 mode for dielectric-disc loading has a finite pass-band rather than the semi-infinite pass-band that is characteristic of dielectric filling. Stop bands are introduced into the simple waveguide dispersion characteristic. The lowest cutoff frequency $f_{co}$ of such periodic lines is calculated exactly from the equivalent circuit concept stated earlier. All other band edges are evaluated by considering the frequencies at which the center-to-center spacing of discs is a multiple of one-half of the guide wavelength (one-half $\lambda_g$). Thus, the lowest cutoff frequency $f_{co}$ is determined strictly by the volumetric filling fraction of dielectric. All higher cutoff frequencies (representing stop bands existing above the lowest cutoff frequency) may be increased by decreasing disc thickness and spacing while maintaining the same filling fraction. As a practical matter, the center-to-center spacing of the discs should be substantially less than one-half the guide wavelength of the dominant (TE–11) mode at the operating frequency.

Figure 4A:
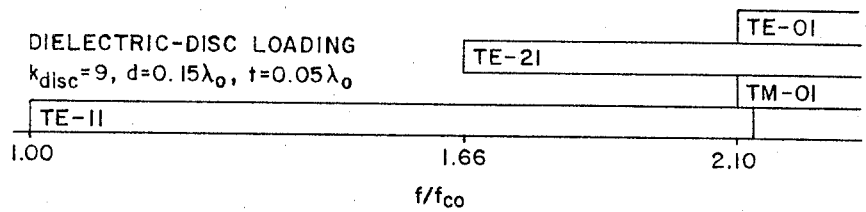
Figure 4B:
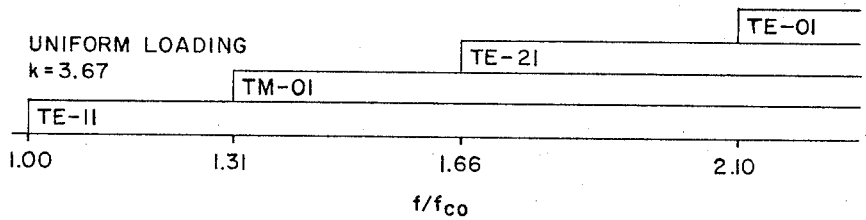
Figure 5:
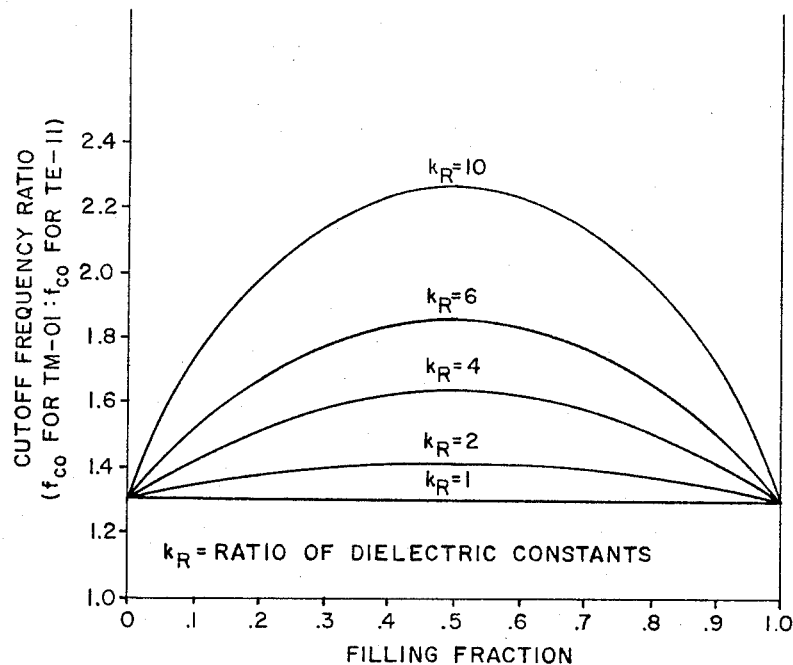

FIGS. 4a and 4b provide a comparison of the relative positions of cutoff for the first several modes in a circular waveguide constructed in accordance with the invention (shown in FIG. 4a) and a circular waveguide with simple uniform filling (shown in FIG. 4b). The most striking difference between the two cases is the difference in the separation of the TE–11 mode and the TM–01 mode. As shown in FIG. 4a, with alumina discs which fill one-third of the volume, this separation is so great that it no longer limits the waveguide's useful bandwidth. The TE–21 mode cutoff frequency, which occurs at a frequency 1.66 times that of the TE–11 mode cutoff frequency, then limits the single mode bandwidth. It will now be appreciated that for this reason, with a filling fraction of one-third the discs need not have a dielectric constant as high as 9 (alumina). Other materials with somewhat lower dielectric constants will yield comparable results since the factor limiting the available single-mode bandwidth will be the TE–21 mode. It has been found that for any value of dielectric constant, the greatest mode separation occurs when each loading disc fills one-half of an iterative period (i.e.—a filling fraction of one-half). The actual relationships involved are shown in FIG. 5 for several different ratios of dielectric constant. With half filling, a ratio of dielectric constants of 4.3 is sufficient to move the TM–01 mode cutoff frequency to 1.66 times that of the dominant mode, which is the limit posed by the TE–21 mode cutoff frequency. This ratio of 4.3 can be achieved by using discs of material having a dielectric constant of 4.3 with the spaces between the discs filled with air (dielectric constant 1) or by different combinations of materials whose ratio of dielectric constants is 4.3.

We may now compare the useful bandwidths of uniformly filled waveguides with the useful bandwidths of waveguides constructed in accordance with the present invention. As a practical matter, it may be desirable to operate from twenty percent above the dominant mode cutoff to a frequency somewhat below the cutoff of the next mode. This means that a circular waveguide with uniform filling which can be used from 1.20 to 1.30 of the dominant mode cutoff frequency, results in an eight percent useful bandwidth, as already noted. In comparison, a circular waveguide constructed in accordance with the present invention which can operate from 1.20 to 1.64 times the dominant mode cutoff frequency, gives a thirty-two percent bandwidth—a four fold increase.

Figures 6A, 6B:
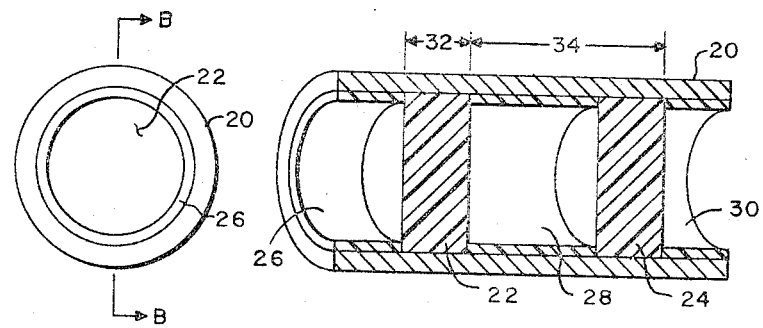
FIGS. 6a and 6b show a portion of waveguide actually constructed in accordance with the invention.

Referring now to FIG. 6, there is shown a section of waveguide which was actually constructed and tested. This waveguide includes a metallic cylindrical member 20 and dielectric discs 22 and 24. The spaces between the discs 22 and 24 contained air and also spacers, in the form of thin rings 26, 28 and 30 constructed of low dielectric constant material, to hold the discs 22 and 24 in position.

Discs 22 and 24 were constructed of alumina (dielectric constant 9) and spacers 26, 28 and 30 were constructed of a low dielectric constant material (dielectric constant close to 1). A filling fraction of one-third was provided by using a disc thickness 32 of 0.05 times the free space wavelength at the operating frequency and a spacing 34 of 0.15 times the free space wavelength at the operating frequency. Measurements made during operational testing gave results substantially as shown in FIGS. 3 and 4a.

Thus, it has been found that by application of the present invention, the useful, or single mode, bandwidth of a circular waveguide can be greatly increased by decreasing the waveguide diameter and including a properly designed dielectric medium comprising regions of different dielectric constants. The invention can be applied to many types of components which use circular waveguide, including rotary joints, attenuators, phase shifters and array radiators, to permit operation over greater bandwidths. Alternatively, for a specified design bandwidth, the present invention enables operation further from cutoff, thereby decreasing the corresponding guide-wavelength bandwidth. For an array radiator, the disc-loaded waveguide offers an additional advantage in providing some control over the equivalent dielectric constant. If the aperture diameter is specified, the greatest radiation loading may be obtained by adjusting the filling fraction of the discs. Once the principles of the present invention are understood, the application of the invention to these and other components can be carried out by persons skilled in the art using established design principles. One specific application will now be described in greater detail.

Figure 7:
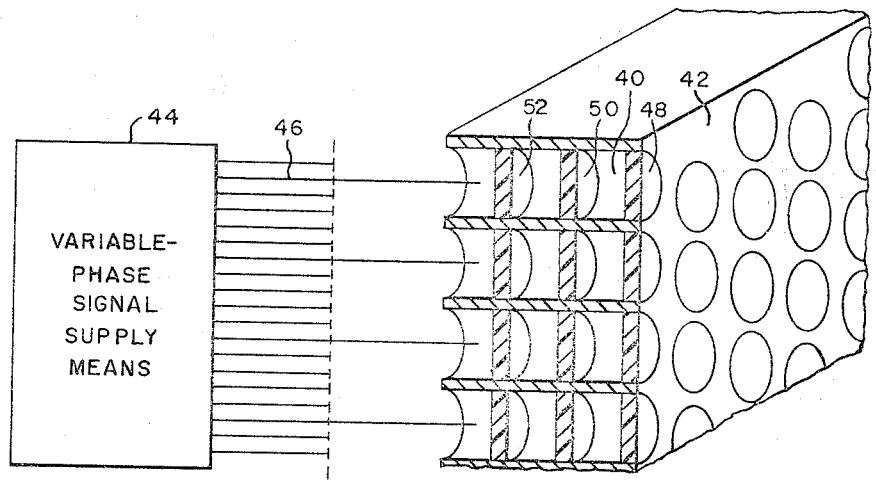
FIG. 7 shows a steerable-beam array antenna utilizing the invention.

Referring now to FIG. 7, there is shown a partially schematic view of a steerable-beam array antenna constructed in accordance with the present invention. The principles of design and construction of steerable-beam array antennas are well known. Basically, a plurality of individual radiating elements are arranged to produce a focused beam which can be steered by varying the relative phase difference of signals applied to neighboring radiating elements, so as to produce differing uniform phase variations across the face of the array. The FIG. 7 antenna includes an array of similar hollow cylindrical members having conductive inner surfaces. As shown, the cylindrical members comprise circular holes, such as 40, formed in a block of metal 42. The antenna also includes means for supplying signals of variable relative phase to the cylindrical members. These means are shown as variable-phase signal supply means 44 and a plurality of transmission lines, such as 46, connecting to the individual cylindrical members such as 40. (Most of these lines have been cut off at an arbitrary point prior to reaching block 42, to promote clarity in the drawing.) The antenna further includes a plurality of dielectric discs, such as 48, 50 and 52, maintained inside each of the cylindrical members such as 40. Means 44 and transmission lines such as 46 can be constructed and arranged in accordance with the prior art.

In the construction and operation of array antennas of this type, it is generally desired that propagation of signals in the cylindrical members be limited to only the dominant (TE–11) mode. It is also commonly desired to provide for operation over a wide band of frequencies, including frequencies higher than 1.31 times the TE–11 mode cutoff frequency. As previously noted, the cutoff frequency for the TM–01 mode in homogeneously-filled circular waveguide is 1.31 times the TE–11 mode cutoff frequency. The result is that for wideband operation, once the 1.31 frequency ratio is exceeded, both the TE–11 mode and the TM–01 mode can propagate. It has been suggested in the prior art that by arranging that the circular waveguides are excited by means 44 only in the TE–11 mode, propagation in the TM–01 mode can be avoided. However, it has been found that even if this has been done, the TM–01 mode still arises due to intercoupling between different radiating elements at the antenna aperture as a result of the phase variation necessary to allow beam steering.

Operation of the antenna constructed in accordance with the present invention can now be described. The FIG. 7 antenna includes a large number of waveguides similar to the FIG. 1 waveguide in both construction and operation. As described with reference to FIG. 1, this construction causes increased separation between the TE–11 mode and the TM–01 mode (refer to FIG. 4a) so that the TM–01 mode cutoff frequency can be moved to at least 1.66 times the TE–11 mode cutoff frequency. The inner diameter of the cylindrical members can then be specified so that the waveguide cutoff frequency for the TM–01 mode is less than 1.66 times, but substantially greater than 1.31 times, the TE–11 mode cutoff frequency. In this way the TM–01 mode is prevented from propagating, while wide-band TE–11 mode of operation is permitted.

Many variations of construction will suggest themselves in applications of the invention. For example, discs of low dielectric constant material could be supported in a cylinder and the spaces then filled with a liquid having a higher dielectric constant and the operation of the waveguide would still be substantially the same as described above.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A mode-separation waveguide for propagating energy in a predetermined frequency range in a single mode comprising:
    coupling means for supplying a signal in a predetermined frequency range;
    a hollow cylindrical member having a conductive inner surface for propagating said supplied signal in a circularly polarized wave and having a cross-section which permits propagation of the dominant mode and cuts off all other modes;
    and a dielectric medium inside said cylinder comprising transverse regions having a first dielectrc constant separated by transverse regions having a lower dielectric constant arranged so that the effective dielectric constant for transverse electric field components is higher than the effective dielectric constant for axial electric field components by a predetermined factor;
    the waveguide being so constructed and arranged that only the dominant mode is propagated and there is increased separation between the cutoff frequencies of the dominant mode and the second mode, as compared to the separation in a circular waveguide completely filled with any homogeneous dielectric.

2. A mode-separation waveguide in accordance with claim 1, wherein said cylindrical member is of circular cross-section whose radius is less than 0.382 of the free space wavelength of the upper frequency of the signal that is propagated and is completely filled with a stratified dielectric medium in which each individual regon is a continuous imperforate transverse layer of homogeneous dielectric material.

3. A mode-separation waveguide in accordance with claim 1, wherein the regions of higher dielectric constants represent a filling fraction of one-half or less, said first dielectric constant is approximately 1 and said higher dielectric constant is 4.3 or higher.

4. A mode-separation waveguide for propagating energy in a predetermined frequency range in a single mode comprising:
    coupling means for supplying a signal in a predetermined frequency range;
    a hollow cylindrical member having a conductive inner surface for propagating said supplied signal in a circularly polarized wave and having a cross-section which permits propagation of the dominant mode and cuts off all other modes;
    and a dielectric medium inside said cylinder comprising transverse regions having a dielectric constant higher than 4 separated by transverse regions having a dielectric constant of approximately 1, with the center-to-center spacings of said regions of higher dielectric constant substantially less than one-half the guide wavelength of the dominant (TE–11) mode at the operating frequency;
    the higher dielectric constant filling fraction and said dielectric constants being such that the second (TM–01) mode cutoff frequency is at least 1.66 times the dominant (TE–11) mode cutoff frequency.

5. A mode-separation waveguide for propagating energy in a predetermined frequency range in a single mode comprising:

coupling means for supplying a signal in a predetermined frequency range;
a hollow cylindrical member having a conductive inner surface for propagating said supplied signal in a circularly polarized wave and having a cross-section which permits propagation of the dominant mode and cuts off all other modes;
and a plurality of dielectric discs maintained in spaced transverse relation inside said cylindrical member with disc thickness and spacing such that the effective dielectric constant is higher for transverse electric field components than for axial electric field components by a predetermined factor;
the waveguide being so constructed and arranged that only the dominant mode is propagated and there is increased separation between the cutoff frequencies of the dominant (TE-11) mode and the second (TM-01) mode, as compared to the separation in a circular waveguide completely filled with any homogeneous dielectric.

6. A mode separation waveguide in accordance with claim 5, wherein the space between the discs contains air and the discs are of circular imperforate cross section, with a diameter substantially the same as the inner diameter of said cylindrical member and the discs have a dielectric constant higher than 2.

7. A mode-separation waveguide in accordance with claim 5, wherein the disc spacing and thickness are such that the disc provides a filling fraction of one-half or less and the discs have a dielectric constant of 4.3 or higher.

8. A mode-separation waveguide for propagating energy in a predetermined frequency range in a single mode comprising:
coupling means for supplying a signal in a predetermined frequency range;
a hollow cylindrical member having a conductive inner surface of circular cross-section whose radius is less than 0.382 of the free space wavelength of the supplied signal;
and a plurality of dielectric discs with a dielectric constant higher than 4 maintained in spaced transverse relation inside said cylindrical member with air contained in the spaces between said discs and with a center-to-center spacing of discs of substantially less than one-half the guide wavelength of the dominant (TE-11) mode at the operating frequency;
the filling fraction represented by said discs and the dielectric constants of the discs and the air being such that the second (TM-01) mode cutoff frequency is at least 1.66 times the dominant (TE-11) mode cutoff frequency.

9. A wide-band steerable-beam array antenna comprising:
an array of similar hollow cylindrical members having conductive inner surfaces capable of propagating circularly polarized waves;
means coupled to said cylindrical members for supplying signals of variable relative phase so that the variation of phase of such signals tends to give rise to propagation in the TM-01 mode;
and a plurality of dielectric discs maintained inside said cylindrical members with disc thickness and spacing such that the effective dielectric constant is higher for transverse electric field components than for axial electric field components by a predetermined factor;
the arrangement and construction being such that there is increased separation between the cutoff frequencies of the TE-11 mode and the TM-01 mode, as compared to the separation in a circular waveguide completely filled with any homogeneous dielectric, this increased separation permitting the inside diameter of said cylindrical members to be small enough to prevent propagation in the TM-01 mode while still allowing wide-band propagation in the TE-11 mode.

10. An antenna in accordance with claim 9, wherein:
the dielectric constant of said discs is higher than 4;
the spaces between the discs contain air;
the filling fraction represented by said discs and said dielectric constants are such that the second (TM-01) mode cutoff frequency is at least 1.66 times the dominant (TE-11) mode cutoff frequency;
and the center-to-center spacing of said discs is substantially less than one-half guide wavelength of the dominant mode at the operation frequency.

References Cited by the Examiner
UNITED STATES PATENTS
3,066,269   11/1962   Barlow _____ 333—95

HERMAN KARL SAALBACH, *Primary Examiner.*
L. ALLAHUT, *Assistant Examiner.*